US005101675A

United States Patent [19]

Lauterwald

[11] Patent Number: 5,101,675

[45] Date of Patent: Apr. 7, 1992

[54] FORCE-STORING ACTUATOR FOR ROTOR OF STEP TRANSFORMER

[75] Inventor: Rolf Lauterwald, Pettendorf, Fed. Rep. of Germany

[73] Assignee: MR Maschinenfabrik Rheinhausen GmbH, Regensburg, Fed. Rep. of Germany

[21] Appl. No.: 613,387

[22] Filed: Nov. 14, 1990

[30] Foreign Application Priority Data

Nov. 17, 1989 [DE] Fed. Rep. of Germany ....... 3938207

[51] Int. Cl.[5] ........................ H01H 5/10; F16H 63/02

[52] U.S. Cl. ........................................ 74/2; 185/40 R; 200/400

[58] Field of Search ........................... 74/2; 185/40 R; 200/400

[56] References Cited

U.S. PATENT DOCUMENTS

| | | | |
|---|---|---|---|
| 1,359,464 | 11/1920 | Piersen | 185/40 |
| 2,412,077 | 12/1946 | Bramley | 185/40 A X |
| 3,183,332 | 5/1965 | Frink et al. | 200/400 |
| 3,190,981 | 6/1965 | Brown | 74/2 X |
| 3,804,204 | 4/1974 | Shono | 74/2 X |
| 3,848,102 | 11/1974 | Jencks et al. | 200/400 |
| 4,761,524 | 8/1988 | Golowash | 200/400 |

FOREIGN PATENT DOCUMENTS

| | | |
|---|---|---|
| 857519 | 6/1956 | Fed. Rep. of Germany . |
| 1184580 | 9/1965 | Fed. Rep. of Germany . |
| 2337658 | 2/1975 | Fed. Rep. of Germany . |
| 2250269 | 10/1975 | Fed. Rep. of Germany . |
| 2719396 | 6/1979 | Fed. Rep. of Germany . |

*Primary Examiner*—Allan D. Herrmann
*Assistant Examiner*—Julie A. Krolikowski
*Attorney, Agent, or Firm*—Herbert Dubno; Andrew Wilford

[57] ABSTRACT

A force-storing actuator for connection to a rotor of a step transformer has a pair of similar levers rotatable about a common axis and having diametrally opposite outer ends, an input element and an output element rotatable about the axis and operatively engageable with the levers, and a latch device for releasably retaining the output element in any of a plurality of angularly offset positions. Respective springs each have one end connected to a respective end of one of the levers and an opposite end connected to a respective end of the other lever and having a middle between the ends. Respective guides movable freely angularly about the axis between the lever ends at generally the same radial spacing from the axis as the lever ends are connected to the middles of the respective springs. Thus the springs each have a pair of sections flanking the respective guide and extending generally tangentially of a circle centered on the axis from the respective spring ends to the respective spring middles.

6 Claims, 3 Drawing Sheets

FORCE-STORING ACTUATOR FOR ROTOR OF STEP TRANSFORMER

FIELD OF THE INVENTION

The present invention relates to an actuator for a rotor of a step transformer. More particularly this invention concerns a force-storing actuator for such a rotor.

BACKGROUND OF THE INVENTION

A step transformer has a rotor that is moved angularly in steps to switch the transformer output and/or input to different taps on the transformer. A terminal must be moved from one tap to the next one with the highest possible starting speed to avoid drawing an arc or to break any arc drawn as quickly as possible.

It is therefore common to provide a spring-loaded force-storing arrangement. Movement of an input element in a direction intended to switch the rotor of the transformer is first merely transferred to this force-storing device to compress and/or extend the spring or springs thereof. Once a critical point is reached, this stored-up spring force is released to snap the rotor angularly to the next position. This therefore allows a relatively slowly moving motor to drive the rotor of the step transformer with the desired snap action.

This can be done as described in German patent 857,519 of B. Jansen by actuating the rotor through a changing-length lever arm. It is therefore possible to achieve the desired snap action, but the mechanism for doing so is fairly complex and expensive because the various guides and the like must be made to fine tolerances. A similar system is described in German patent 1,184,580 of Al Bleibtreu which uses a spring arrangement and a complex system of levers and roller guides.

German patent 2,719,396 uses an additional spring in the force-storing arrangement. This extra spring only is effective in the last portion of the tensioning operation and thus is effective only at the start of the release movement so as to achieve a high starting speed. Once again, the use of this extra spring complicates the mechanism of the device and requires that a fairly strong main drive motor be used.

Accordingly German patent 2,250,260 of E. Baumgartner describes a system with two coaxial levers having ends interconnected by springs. A snap-action cam is effective between these levers and the rotor shaft of the step transformer. In this arrangement the springs remain substantially parallel to each other so that force is not accurately transmitted to the levers.

Similarly in German patent document 2,337,658 of F. Pelz parallel springs are employed which are stretched from different points. On tensioning a gear wheel rolls on an inner ring gear of the housing so as to tension a spring that is only released at the end of its travel. In these arrangements the springs are stressed within the limits of their elasticity, that is in the straight parts of their response curves. Unfortunately considerable spring force is lost to the various elements that must be actuated to eventually move the actual switch rotor, as the springs are invariably stressed diametrally while a rotary force is needed to operate the step transformer.

OBJECTS OF THE INVENTION

It is therefore an object of the present invention to provide an improved force-storing actuator for a step transformer.

Another object is the provision of such an improved force-storing actuator for a step transformer which overcomes the above-given disadvantages, that is which is of simple construction but that which operates the step transformer with a very high starting speed even if powered by a relatively slow and weak motor.

SUMMARY OF THE INVENTION

A force-storing actuator for connection to a rotor of a step transformer has a pair of similar levers rotatable about a common axis and having diametrally opposite outer ends, an input element and an output element rotatable about the axis and operatively engageable with the levers, and a latch device for releasably retaining the output element in any of a plurality of angularly offset positions. Respective springs each have one end connected to a respective end of one of the levers and an opposite end connected to a respective end of the other lever and having a middle between the ends. According to this invention respective guides movable freely angularly about the axis between the lever ends at generally the same radial spacing from the axis as the lever ends are connected to the middles of the respective springs. Thus the springs each have a pair of sections flanking the respective guide and extending generally tangentially of a circle centered on the axis from the respective spring ends to the respective spring middles.

Thus the springs are in effect deflected so that they are effective almost purely angularly on the ends of the levers. As a result the mechanism is extremely simple while still giving the desired snap action needed to avoid arc formation in a step transformer.

According to another feature of this invention each of the guides is a radially projecting arm extending from and pivotal about the axis and having an outer end to which the respective spring middle is attached. These arms can be displaceable pivotally independently of each other or can be fixed together for joint angular displacement.

Furthermore according to the invention the guides can include a track generally centered on the axis and respective elements displaceable along the track and attached to the middles of the respective springs. This track can be elliptical or substantially circular.

Instead of using two one piece spring, it is possible for each spring to be formed by a pair of independent coil-type spring sections.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
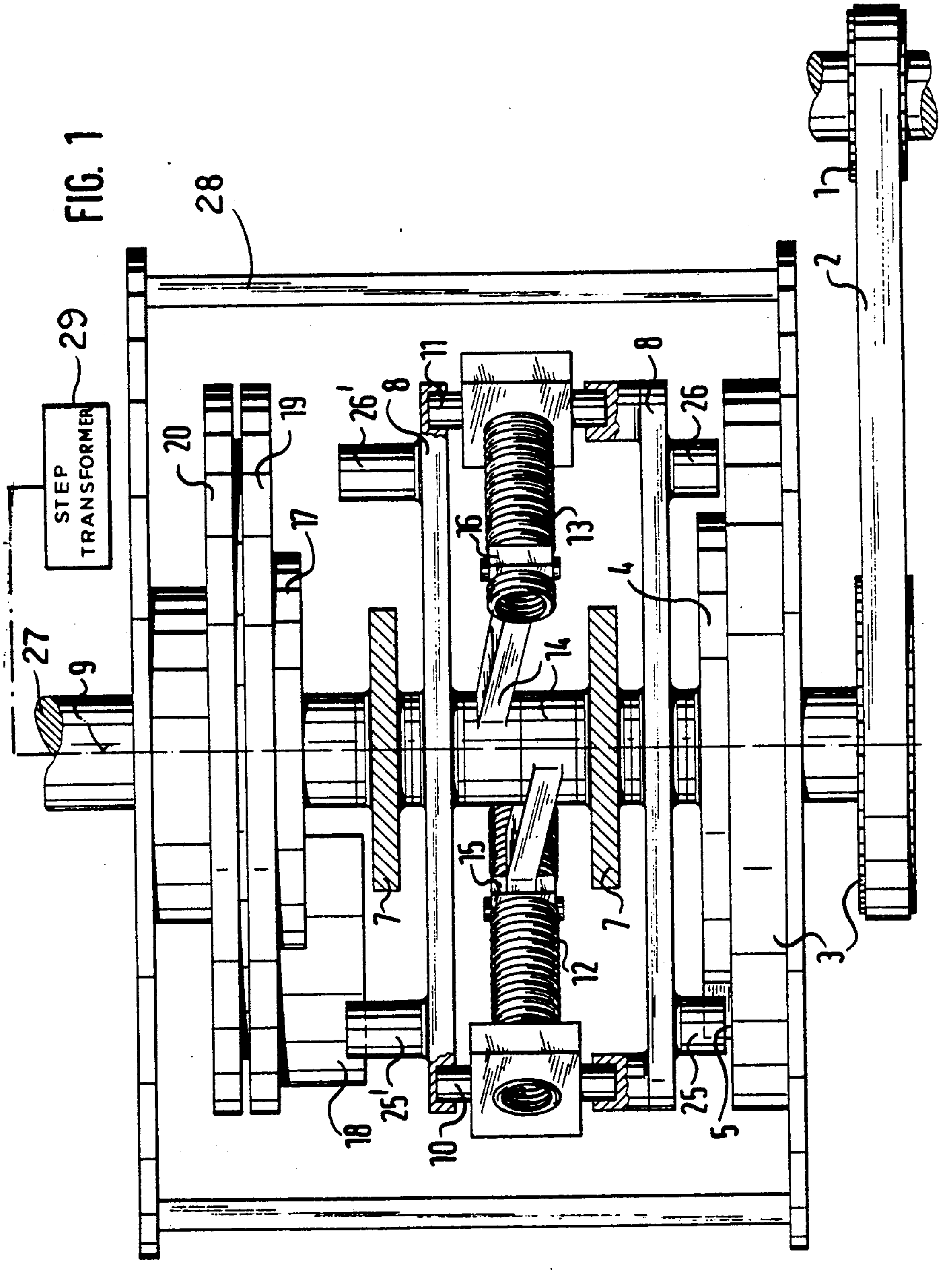
FIG. 1 is a partly diagrammatic side view of the force-storing drive of this invention.

As seen in FIG. 1 a drive housing 28 surrounds an upright axis 9. A drive pulley 1 fixed on the shaft of an unillustrated stepping motor is connected Via a toothed belt 2 to an input wheel indicated generically at 3 and rotatable on the housing 28 about the axis 9. This wheel 3 is formed with a cam 4 having two diametrally opposite and identical pusher segments with angularly directed pusher faces 5. The wheel 3 also has four angularly equispaced and radially projecting pawl-tripping formations 6. It is rotated normally through 90 steps by the motor.

An output shaft 27 projecting upward along the axis 9 out the top of the housing 28 is connected to a rotor of a schematically illustrated step transformer 29. This shaft 27 is fixed to an output wheel 19, 20 formed between its disk halves 19 and 20 with four angularly equispaced stop teeth 30 shown in a radially offset position for clarity in FIGS. 2*a* and 2*b*) and provided on its underside with another cam 17 having two entrainment segments 18 formed like the segments 32 of cam 4 with pusher faces 31 like the pusher faces 5.

Independently rotatable about the axis 9 above the wheel 3 and below the wheel 19, 20 are levers 7 and 8 each provided with downwardly projecting entrainment pins 25 and 26 that can engage the pusher faces 5 of the segment 32 and upwardly projecting entrainment pins 25′ and 26′ that can engage the faces 31 of the segment 18. Springs 12 and 13 have outer ends pivoted at 10 and 11 on the ends of the levers 7 and 8 and middles pivoted at points 15 and 16 on guide arms 14 projecting radially from the axis 9 and freely rotatable thereabout.

Pivoted on the housing 28 at respective locations 23 and 24 offset from the axis 9 are pawls 21 and 22 that can angularly engage opposite flanks of the stops 30. These pawls 21 and 22 can be pivoted out of engagement with the stops 30 by the formations 6 in a manner described below. Normally they are, however, urged radially by unillustrated springs to engage the teeth 30 and arrest the wheel 19, 20 angularly in any of four angularly offset positions.

Figure 2A:
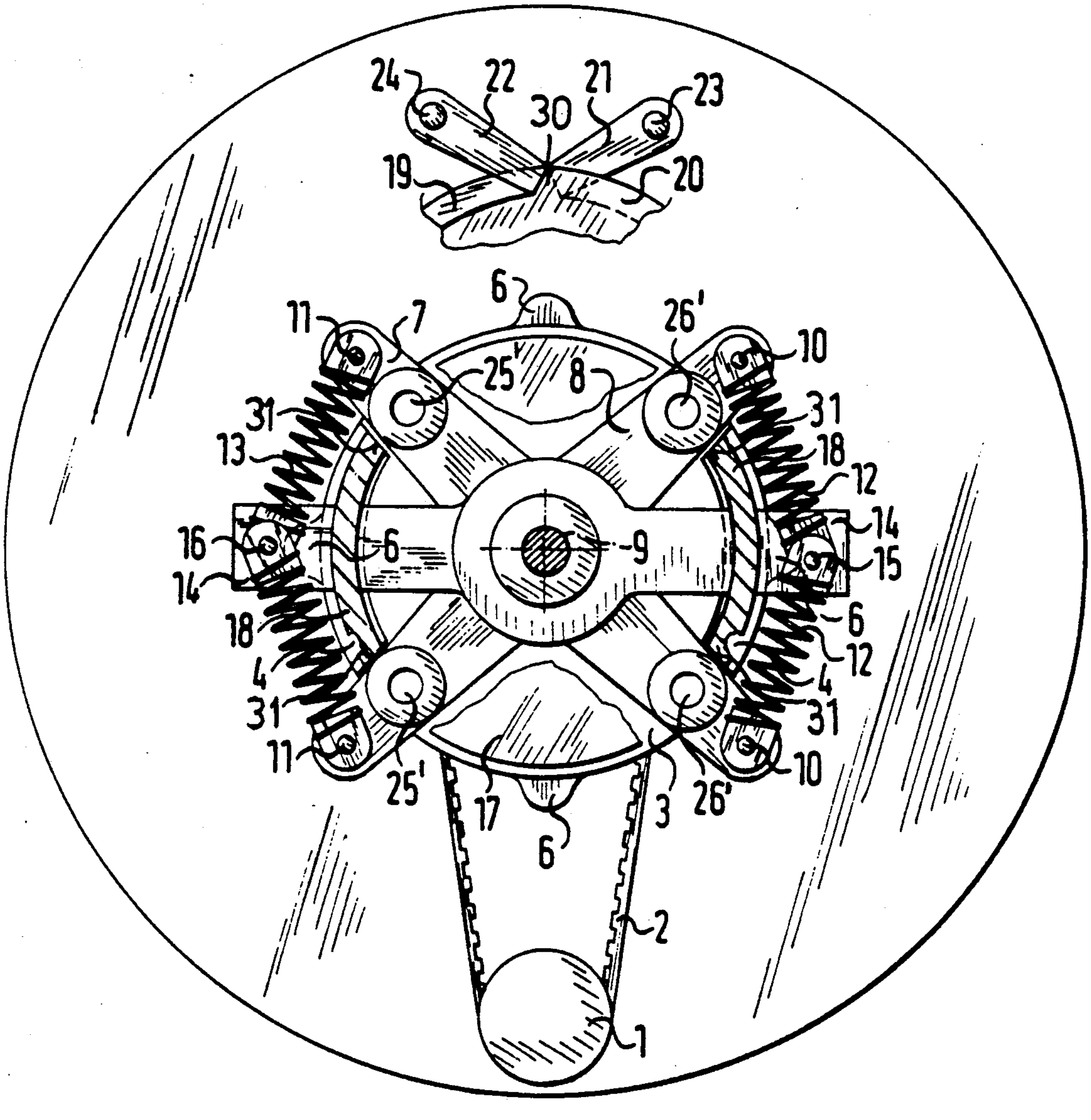
FIGS. 2*a* and 2*b* are horizontal sections showing the drive in two different positions.
Figure 2B:
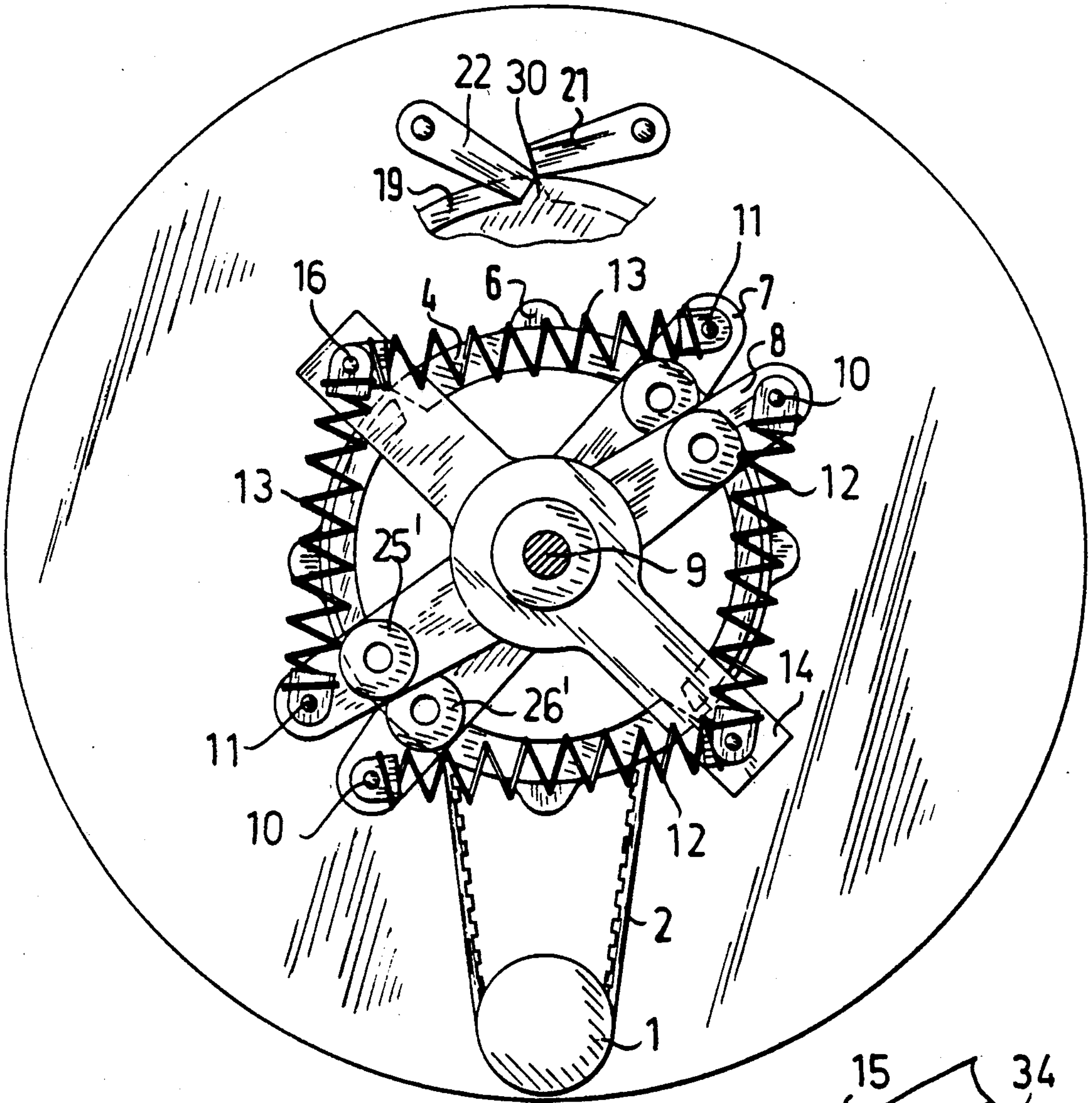

As seen in FIG. 2*a* the two levers 7 and 8, which are substantially identical, normally extend at about 90° to each other with the pusher segment 3 diametrally opposite the pusher segment 18. The segments 32 are engaged between the pins 25 and 26 of the levers 7 and 8 and the segments 18 between the pins 25′ and 26′, and the levers 14 lie angularly midway between the respective pivots 10 and 11 of the respective springs 12 and 13. In this position, in which the pawls 21 and 22 are also both locked against one of the teeth 30, everything is stable and both sides of each spring 12 and 13 are equally tensioned or compressed.

In order to move the rotor of the transformer 29 through a 90° degree step, for instance clockwise, the motor 1 rotates the input wheel 4 through 90°. This action causes the following to happen:

First of all one of the end faces 5 of each of the input drive segments 32 comes into engagement with the respective pin 25 or 26 and rotates the lever 7 clockwise. As this lever 7 moves clockwise both springs 12 and 13 are tensioned and the arms 14 move angularly through an arc equal to just half of the angular travel of the lever 7. Both springs 12 are tensioned greatly but no rotation whatsoever is transmitted to the lever 8 whose pins 25′ and 26′ remain blocked against the faces 31 of the segments 18 of the wheel 19 and 2 which is prevented from rotating clockwise by the pawl 21.

At the very end of the 90° rotation of the wheel 3, the tripping formation 6 engages the pawl 21 and pushes it momentarily outward, freeing the wheel 19, 20 to rotate. The stored-up energy in the springs 12 and 13 therefore rapidly pulls the lever 8 clockwise into a position 90° offset from the lever 7. Since the pins 25′ and 26′ are at this time braced against the faces 31 of the segments 13, this action advances the wheel 19, 20 angularly 90° and steps the transformer 29. Thus a relatively slowly moving and weak motor attached to the drive pulley 1 can serve for fast snap action of the output shaft 27.

Of course for opposite angular movement of the shaft 27, all that is necessary is that the input wheel 3 be rotated oppositely. The above-described actions take place, but in the opposite direction with the opposite ends of the segments 32 and 18 being effective, and the pawl 22 is tripped instead of the pawl 21.

Figure 3:
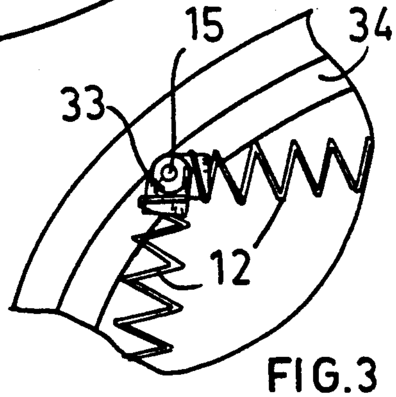
FIG. 3 is a top view of a detail of another arrangement in accordance with this invention.

The arms 14 can move angularly independently of each other, or can be fixed together like a two-arm lever. In addition as shown in FIG. 3 it is possible to provide roller-type guides 33 for the springs 12 or 13 which can replace the pivots 15 or 16 and which ride in an arcuate track 34 formed in the housing 28. The track 34 can be circular, elliptical, or otherwise shaped in order to provide the desired degree of spring stretch at the desired location. In addition of course each spring 12 or 13 can be a single one-piece spring whose center is attached to the respective pivot 15, 16 or guide 33 or can be formed as illustrated of two identical coil-spring halves.

I claim:

1. A force-storing actuator for connection to a rotor of a step transformer, the actuator comprising:
   - a pair of similar levers rotatable about a common axis and each having diametrally opposite outer ends;
   - an input element and an output element rotatable about the axis and operatively engageable with the levers;
   - latch means for releasably retaining the output element in any of a plurality of angularly offset positions;
   - respective springs each having one end connected to a respective end of one of the levers and an opposite end connected to a respective end of the other lever and having a middle between the ends; and
   - respective guides movable freely angularly about the axis between the lever ends at generally the same radial spacing from the axis as the lever ends, the guides being connected to the middles of the respective springs, whereby the springs each have a pair of sections flanking the respective guide and extending generally tangentially of a circle centered on the axis from the respective spring ends to the respective spring middles.

2. The force-storing actuator defined in claim 1 wherein each of the guides is a radially projecting arm extending from and pivotal about the axis and having an outer end to which the respective spring middle is attached, the arms being displaceable pivotally independently of each other.

3. The force-storing actuator defined in claim 1 wherein each of the guides is a radially projecting arm extending from and pivotal about the axis and having an outer end to which the respective spring middle is attached, the arms being fixed relative to each other and extending diametrally of the axis.

4. The force-storing actuator defined in claim 1 wherein the guides includes a track generally centered on the axis and respective elements displaceable along the track and attached to the middles of the respective springs.

5. The force-storing actuator defined in claim 4 wherein the track is substantially circular.

6. The force-storing actuator defined in claim 1 wherein the spring sections are separate.

* * * * *